(12) United States Patent
Martinez et al.

(10) Patent No.: US 10,168,137 B2
(45) Date of Patent: Jan. 1, 2019

(54) DUAL LASER FREQUENCY SWEEP INTERFEROMETRY SYSTEM AND METHOD

(71) Applicant: The Secretary of State for Business, Innovation & Skills, London (GB)

(72) Inventors: Juan Jose Martinez, Pontypridd (GB); Nigel Joseph Copner, Pontypridd (GB); Matthew Stuard Warden, Teddington (GB); Edward Benjamin Hughes, Teddington (GB); Michael Aloysius Campbell, Teddington (GB)

(73) Assignee: NPL Management Limited, Teddington (GB)

( * ) Notice: Subject to any disclaimer, the term of this patent is extended or adjusted under 35 U.S.C. 154(b) by 109 days.

(21) Appl. No.: 15/322,017

(22) PCT Filed: Jun. 24, 2015

(86) PCT No.: PCT/GB2015/051839
§ 371 (c)(1),
(2) Date: Dec. 23, 2016

(87) PCT Pub. No.: WO2015/198044
PCT Pub. Date: Dec. 30, 2015

(65) Prior Publication Data
US 2017/0146335 A1 May 25, 2017

(30) Foreign Application Priority Data
Jun. 24, 2014 (GB) .................................. 1411206.4

(51) Int. Cl.
*G01B 9/02* (2006.01)
*G01B 11/02* (2006.01)
(Continued)

(52) U.S. Cl.
CPC ..... *G01B 9/02007* (2013.01); *G01B 9/02004* (2013.01); *G01B 9/02027* (2013.01);
(Continued)

(58) Field of Classification Search
CPC ............ G01B 9/02004; G01B 9/02007; G01B 9/02027; G01B 9/02084; G02F 1/3536; H01S 5/0687; H01S 5/5054
See application file for complete search history.

(56) References Cited

U.S. PATENT DOCUMENTS

| 5,485,272 A | 1/1996 | Dirksen et al. |
| 6,005,698 A | 12/1999 | Huber et al. |

(Continued)

FOREIGN PATENT DOCUMENTS

| EP | 0843152 A2 | 5/1998 |
| EP | 0981189 A2 | 2/2000 |

(Continued)

OTHER PUBLICATIONS

Office action response for EPO Application No. 15744631.1 (dated Aug. 2, 2017).

(Continued)

*Primary Examiner* — Michael A Lyons (57) ABSTRACT

An optical arrangement, method and measurement system are disclosed. The arrangement includes a first input to receive a first beam from a frequency swept laser, a second input to receive a second beam from a fixed frequency pump laser source. A non-linear optical artifact receives and intermodulates the first and second beams to generate a third beam, the third being an inverted copy of the first beam mirrored relative to the fixed frequency of the pump laser source. A selective combining element outputs the first and third beams. The non-linear artifact or one or both of the lasers is selected or configured such that the optical fre- (Continued)

quency separation of the first and second beams satisfies the coherence length condition of the non-linear artifact.

15 Claims, 7 Drawing Sheets

(51) Int. Cl.
    *G01S 17/32*     (2006.01)
    *G01S 7/491*     (2006.01)
    *G02F 1/35*     (2006.01)

(52) U.S. Cl.
    CPC ........ *G01B 9/02084* (2013.01); *G01B 11/026* (2013.01); *G01S 7/4911* (2013.01); *G01S 7/4915* (2013.01); *G01S 17/325* (2013.01); *G02F 1/3536* (2013.01)

(56) References Cited

U.S. PATENT DOCUMENTS

| | | | | |
|---|---|---|---|---|
| 7,705,993 | B2* | 4/2010 | Bogoni | G01J 11/00 |
| | | | | 356/450 |
| 2002/0064335 | A1* | 5/2002 | Aoki | G01M 11/3163 |
| | | | | 385/15 |
| 2003/0048503 | A1* | 3/2003 | Aso | G02F 1/3536 |
| | | | | 398/79 |
| 2006/0088068 | A1 | 4/2006 | Farrell et al. | |
| 2007/0046952 | A1 | 3/2007 | Kikuchi | |
| 2007/0097337 | A1 | 5/2007 | Courville et al. | |
| 2008/0088849 | A1* | 4/2008 | De Lega | G01B 9/02044 |
| | | | | 356/450 |
| 2010/0085992 | A1 | 4/2010 | Rakuljik et al. | |
| 2015/0055138 | A1* | 2/2015 | Hughes | G01S 17/325 |
| | | | | 356/482 |

FOREIGN PATENT DOCUMENTS

| | | | |
|---|---|---|---|
| JP | 2007271925 A | * | 10/2007 |
| WO | 2007144654 A1 | | 12/2007 |
| WO | 2013113481 A1 | | 8/2013 |

OTHER PUBLICATIONS

Communication pursuant to Rules 161(1) and 162 of the EPC for EPO Application No. 15744631.1 (dated Feb. 2, 2017).
Communication under Rule 71(3) of the EPC for EPO Application No. 15744631.1 (dated Jul. 11, 2017).
Int'l Preliminary Report on Patentability for PCT/GB2015/051839 (dated Dec. 27, 2016).
Int'l Search Report for PCT/GB2015/051839 (dated Oct. 7, 2015).
Examination Opinion for GB1511133.9 (dated Dec. 23, 2015).

* cited by examiner

FIG. 1

(PRIOR ART)

FIG. 2

(PRIOR ART)

(PRIOR ART)

DUAL LASER FREQUENCY SWEEP INTERFEROMETRY SYSTEM AND METHOD

FIELD OF THE INVENTION

The present invention relates to a system and method for use in dual laser frequency sweep interferometry (dual sweep FSI).

BACKGROUND TO THE INVENTION

Interferometry measurement is a technique to measure the distance to a target or targets using wavelengths such as light. It can be used in many different fields and applications including: long distance measurement, 3-dimensional positioning where the ability to measure simultaneously to multiple targets from a single interferometer is particularly advantageous (using mainly frequency only) and small displacements (using also phase) for engineering and aerospace applications; surface inspection and imaging for quality control devices; short range detailed imaging for biological applications like the optical coherence tomography (OCT) techniques.

Figure 1:
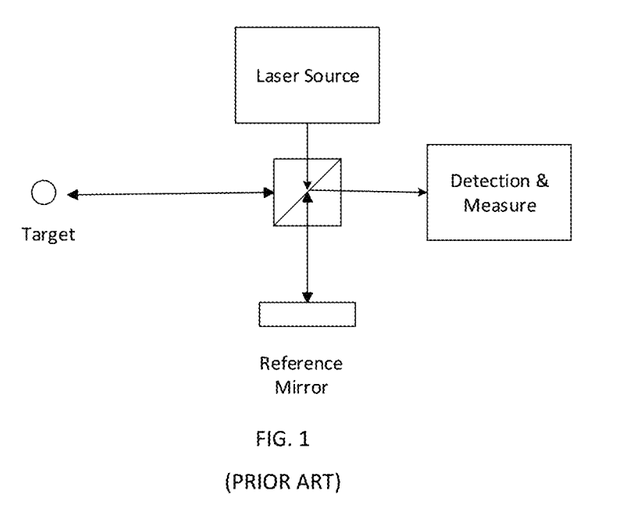
FIG. 1 is a diagram of a Frequency Scanning Interferometry system.

Frequency Scanning Interferometry (FSI, also known as Frequency Sweeping Interferometry) is one type of interferometry that is used to measure the distance to a cooperative, reflecting target or a non-cooperative, specular surface using light. It is also known as Wavelength Shifting Interferometry, Frequency Modulated Continuous Wave ranging and laser radar. An example implementation is shown in FIG. 1.

FSI uses an interferometer to illuminate the target point (in the case of a so called non-cooperative target) or points or a cooperative retro-reflecting target or targets. The interferometer provides some means of splitting light from a light source into a reference and measurement beam. The measurement beam is directed towards the target point (or points), which reflect some of the incident light back to the interferometer. The reference beam is reflected by a reference mirror within the interferometer so that the returning reference beams and measurement beams are combined at a detector or receiver.

Figure 2:
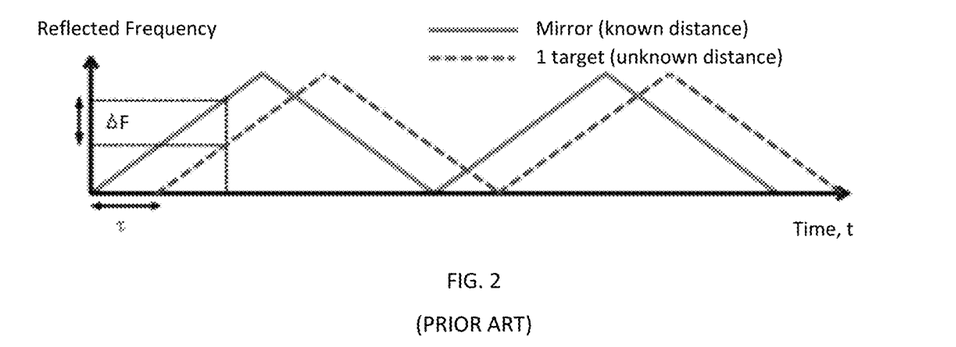
FIG. 2 is graph plotting reflected frequencies against the time of arrival to a receiver of the system of FIG. 1.

FSI uses a tuneable laser as a light source. The frequency of the light from the tuneable laser is swept through a range of frequencies. When this is done, a sinusoidal signal is received at the detector. The frequency of this signal is proportional to the distance to the target, and hence measuring the signal frequency allows the distance to the target to be measured. This is shown in FIG. 2 where the reflected frequencies are represented against the time of arrival to the receiver. The observed frequency difference (beat frequency), $\Delta F$ is proportional to the round-trip time of the measurement beam, $\tau$, which is related to the distance, D, to the target through the speed of light, c.

$$D = c\frac{\tau}{2}$$

Taking advantage of the continuous sweep, the time delay caused by the different distance creates a beat frequency. The frequency of this beat is directly proportional to the distance to the target if the sweep is linear (or if it is linearized through another reference) and since frequency processing though the FFT is easier and more reliable than a time delay measurement this method is particularly useful for precise measurements.

Different alternatives of this design have been suggested, ranging from simple systems that rely on frequency only to more complex systems that add phase measurement (which improves precision but the system is less flexible due to additional references required and problems arise if the signal is lost at any point).

In FSI, the optical frequency of the laser during a measurement can be described with the following equation:

$$f(t)=2\pi(\alpha t+f_0)$$

Where f(t) is the optical frequency of the laser light, $\alpha$ is the rate of change of laser frequency, $$-\frac{T}{2} < t < \frac{T}{2}$$

is the time (where T is the total measurement time) and $f_0$ is the laser frequency at t=0. With this sweep the intensity of the field after the interferometric detection, if we eliminate the DC and high frequency components, matches the following expression:

$$I(t, \tau) = A \cdot \cos\left[2\pi\left(\alpha\tau t + f_0\tau - \frac{\alpha\tau^2}{2}\right)\right]$$

$\tau$ is the time delay between the reference mirror and the target, and $\alpha t$ is the measured beat signal frequency $\Delta F$ in FIG. 2. The $\tau^2$ term is usually negligible and is therefore discarded. This expression can be easily evaluated through a frequency Fourier analysis (for example by fast Fourier transform, FFT) and if $\tau$ is constant this will give a clear peak at the frequency, $\Delta F$, that corresponds to the distance to the target. In non-ideal situations, a problem appears when the target is moving, either intentionally or due to vibration, or if the optical path is changing due to e.g. air motion, and thus $\tau$ has a dependence of t. As $f_0$ is large in comparison to the other terms in the argument of the cosine, even small variations of T during a measurement can cause a large disturbance to the signal. This Doppler shift greatly increases the distance measurement uncertainty, both through increasing the variance of measurements when the target movement is random between measurements (e.g. when caused by vibration), and by the presence of systematic errors present when the target motion is at a constant rate.

The use of two different sweeps (from two different optical sources) has been applied to solve this problem. This is known as Dual-sweep FSI. For example the system described in U.S. Pat. No. 8,687,173 uses two tuneable laser operated at two different tune rates and tuned in opposite directions (one up and one down in frequency) to produce a single signal on a single photodetector with two frequency components; one from each laser. By separating the two signals in frequency, they can be independently processed to determine a single distance measure that is largely free of Doppler induced error.

An alternative solution was proposed by Schneider et al (2000) in which two lasers operated at the same tuning rate, but in opposite directions to produce two signals. The lasers need to be separated (in frequency, polarization or other technique) so they can be independently detected by two different receivers where we will have the following signals:

$$I_1(t, \tau) = A \cdot \cos\left[2\pi\left(\alpha_1 \tau t + f_{0,1}\tau - \frac{\alpha_1 \tau^2}{2}\right)\right]$$

$$I_2(t, \tau) = A \cdot \cos\left[2\pi\left(\alpha_2 \tau t + f_{0,2}\tau - \frac{\alpha_2 \tau^2}{2}\right)\right]$$

Multiplying $I_1(t,\tau)$ and $I_2(t,\tau)$, we obtain $$I_1(t, \tau) \cdot I_2(t, \tau) = \frac{1}{2} A_1 \cdot A_2 \cdot \{\cos[2\pi((\alpha_1 - \alpha_2)\tau t + (f_{0,1} - f_{0,2})\tau)] + \cos[2\pi((\alpha_1 - \alpha_2)\tau t + (f_{0,1} - f_{0,2})\tau)]\}$$

Making the lasers sweep their frequencies at the same speed, but in opposite directions (in which case, $\alpha_1 = -\alpha_2$, and $f_{0,1} \approx f_{0,2}$) the above expression becomes $$I_1(t, \tau) \cdot I_2(t, \tau) = \frac{1}{2} A_1 \cdot A_2 \cdot \{\cos(4\pi\alpha_1 \tau t) + \cos(4\pi f_{0,1}\tau)\}$$

The first term is a cosine with a frequency proportional to the distance to be measured, but which does not suffer from a large disturbance when τ varies during a measurement. The second term is a low frequency signal, and does not interfere with our analysis.

Alternatively, if $\alpha_1 = -\alpha_2$, and $f_{0,1} \neq f_{0,2}$ expressing the average of $f_{0,1}$ and $f_{0,2}$ as $f_p$, and multiplying $I_1(t,\tau)$ and $I_2(t,\tau)$, we obtain $$I_1(t, \tau) \cdot I_2(t, \tau) =$$
$$\frac{1}{2} A_1 \cdot A_2 \cdot \{\cos(4\pi\alpha_1 \tau t + (f_{0,1} - f_{0,2})\tau) + \cos(4\pi f_p \tau)\}$$

Again, the first term is a cosine with a frequency proportional to the distance to be measured, but which does not suffer from a large disturbance when T varies during a measurement. The second term is a low frequency signal that conveys information about the relative motion (either mechanical motion or optical path length variation) between the sensor and target.

In the equations above, t represents time and it is assumed that $\alpha_1$ and $\alpha_2$ vary linearly with time. If $\alpha_1$ and/or $\alpha_2$ do not vary linearly with time, t, then parameter t could be replaced with another parameter, i, with which $\alpha_1$ and $\alpha_2$ do vary linearly.

This scheme can be realised using two separate tuneable lasers that are operated in a synchronised way to tune at exactly the same rate, but in opposite directions.

The tuneable lasers required in dual-sweep FSI systems are often the most expensive component in this type of system (particularly if high precision is required which requires large mode-hop-free tuning range), and synchronising their frequency sweeps with sufficient accuracy can be difficult. The distance resolution/accuracy that can be achieved is related directly to the frequency range over which the laser can be mode-hop-free tuned. Generally, the larger the tuning range of the laser the greater the cost.

There have been attempts to improve on accuracy of dual-sweep FSI systems that, for example, include different combinations of lasers and synchronisation methods.

However, despite improvements, the approach remains very expensive and complex to implement and maintain.

Figure 11:
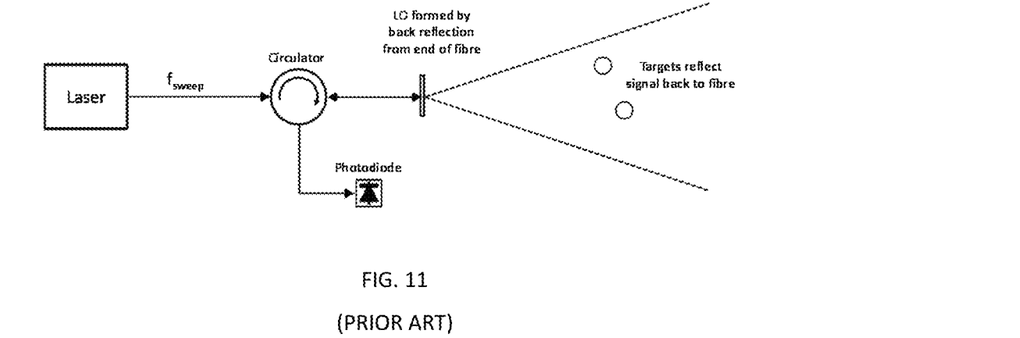
FIG. 11 shows how an interferometer can be formed using the end of a fibre as a beam splitter with a circulator used to split the input and output beams.

FSI uses heterodyne detection to generate a sinusoidal signal by beating the measurement beam with the reference beam as illustrated in FIG. 11, which shows a circulator being used to take a tuned laser output. A fraction of the light passed through the circulator from the laser is reflected back from the end face of the fibre forming the reference signal. The majority of the light projects into space where it is reflected by one or more targets. The reflected light returns to the fibre end and couples back into the fibre and is directed by the circulator along with the reference beam to a photodetector where the beams interfere and produce a signal. The reference beam thus performs the role of local oscillator (LO). It is generally know that the signal amplitude is proportional to the product of the LO and measurement beams amplitudes. So increasing the LO or measurement beam amplitude results in higher signal levels. But, for industrial applications, the measurement beam must be kept eye-safe to prevent injury to the user. This limits the amount of signal gain that can be obtained by increasing the measurement beam amplitude. Improved signal gain can therefore be best achieved by control of the reference beam amplitude.

A convenient way of generating the LO beam is by back reflection from the end of an optical fibre that is used to transmit the laser light to the point on the measurement. This conveniently places the measurement datum at the physical end of the fibre (as in FIG. 8). A second advantage of this approach is that disturbances to the measurement and reference beams as they propagate down the fibre due to stresses in the fibre (temperature, physical strain etc) are common-mode and do not contribute to the signal detected at the detector.

However, taking the LO signal from the fibre end in this way limits the amount of signal gain that can be achieved. An un-modified fibre will reflect approximately 4% of the incident light resulting in a weak LO signal. The reflectance can be increased by coating the end of the fibre. But increasing the reflectance to increase the LO signal degrades the measurement signal as it is coupled back into the fibre on return from the target(s). The optimum reflectance is 33%.

Figure 12:
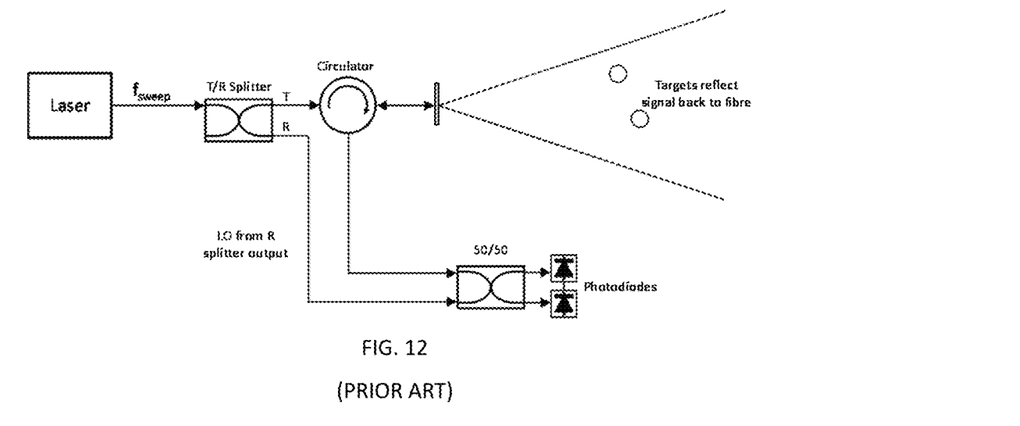
FIG. 12 shows how the basic setup of FIG. 11 can be modified with the inclusion of a splitter with split ratio R:T in order to allow control over the optical gain. This setup also facilitates balanced detection for improved SNR.

An alternative way of deriving the LO reference is to use a splitter with a split ratio R:T as illustrated in FIG. 12. The splitter sends R % of the light into the LO beam and T % into the measurement beam. A circulator is again used to direct the measurement beam out into space and return the measurement beam down the return fibre. The LO and measurement beams are then combined by a 50:50 coupler to produce two signals that can be detected using a balanced detector. This setup has the advantages that the gain can be controlled by setting the R:T ratio and laser power appropriately to result in the desired signal gain whilst maintaining eye-safe power levels in the measurement beam.

The draw-back of this approach is that the LO and measurement beams no longer take a common path through the optical fibres, so any disturbance to the fibres due to, for example, temperature change or other stresses will result in drift in the distance measurements. In other words, the measurement datum is not well defined.

The challenge is therefore to produce a system that is cost effective, can operate to measure multiple targets simultaneously (for coordinate metrology applications), has sufficient optical gain to provide robust signals and provides a reliable, drift free measurement datum.

STATEMENT OF INVENTION

According to an aspect of the present invention, there is provided an optical arrangement including:
- a first input to receive a first beam from a frequency swept laser;
- a second input to receive a second beam from a fixed frequency pump laser source;
- a non-linear optical artefact to receive, and to intermodulate, the first and second beams to generate a third beam, the third being an inverted copy of the first beam mirrored relative to the fixed frequency of the pump laser source; and,
- a selective combining element to output the first and third beams,
- wherein non-linear artefact is selected or configured such that the optical frequency separation of the first and second beams satisfies the coherence length condition of the non-linear artefact.

The optical arrangement may further comprise a first coupler to receive the first beam, to divide the beam into a first and second portion and provide the first portion to the non-linear optical artefact.

The non-linear optical artefact may comprise a semiconductor optical amplifier.

Preferably, the non-linear artefact induces four-wave mixing to generate the third beam.

The optical arrangement may further comprise a filter to extract the third beam from the output of the non-linear optical artefact.

According to another aspect of the present invention, there is provided a dual laser beam sweep generation system including:
a frequency swept laser source, a pump laser source and an optical arrangement as recited above, the frequency swept laser being coupled to the first input and the pump laser source being coupled to the second input.

According to another aspect of the present invention, there is provided a measurement system operable to receive a first measurement beam and a second measurement beam from a frequency swept laser source, the second measurement beam including the first measurement beam and a mirror copy of the first measurement beam,
the measurement system being arranged to direct the second measurement beam along an optical fibre into an interferometer and measure light returning back along the optical fibre,
the measurement system being further arranged to direct the first measurement beam into a further interferometer and to derive a sampling signal therefrom, the measurement system being arranged to sample the light of the second measurement beam returning back along the optical fibre at a frequency dependent on the sampling signal.

The measurement system may further comprise a data analysis system arranged to estimate frequency or frequencies of the sampled light of the second measurement beam returning back along the optical fibre and determine the distance or distances to be measured therefrom.

The data analysis system may be arranged to compute a Fast Fourier Transform and estimate a location of a peak by performing a fit to determine said distance.

The data analysis system may be arranged to isolate individual signal components corresponding to individual targets by windowing in the frequency domain or narrow band-pass filtering in the time domain prior to computing a Fast Fourier Transform and estimating a location of a peak by performing a fit to determine the distance to each target.

According to another aspect of the present invention, there is provided a method for generating a dual laser frequency swept signal including:
- receiving a first beam from a frequency swept laser;
- receiving a second beam from a fixed frequency pump laser source;
- intermodulating, the first and second beams in a non-linear optical artefact to generate a third beam, the third being an inverted copy of the first beam mirrored relative to the fixed frequency of the pump laser source; and,
- outputting the first and third beams,
- wherein non-linear artefact is selected or configured such that the optical frequency separation of the first and second beams satisfies the coherence length condition of the non-linear artefact.

The method may further comprise dividing the first beam into a first and second portion and providing the first portion to the non-linear optical artefact.

The method preferably comprises inducing, at the non-linear artefact, four-wave mixing to generate the third beam.

The method may further comprise filtering the output of the non-linear optical artefact to extract the third beam.

According to another aspect of the present invention, there is provided a measurement method including:
receiving a first measurement beam and a second measurement beam from a frequency swept laser source, the second measurement beam including the first measurement beam and a mirror copy of the first measurement beam,
directing the second measurement beam along an optical fibre into an interferometer;
measuring light returning back along the optical fibre,
directing the first measurement beam into a further interferometer and deriving a sampling signal therefrom; and,
sampling the light of the second measurement beam returning back along the optical fibre at a frequency dependent on the sampling signal.

According to another aspect of the present invention, there is provided a dual laser beam sweep generation system including:
- a frequency swept laser source coupled to a first input to provide a first beam from the frequency swept laser;
- a fixed frequency pump laser source coupled to a second input to provide a second beam;
- a non-linear optical artefact to receive, and to intermodulate, the first and second beams to generate a third beam, the third being an inverted copy of the first beam mirrored relative to the fixed frequency of the pump laser source; and,
- a selective combining element to output the first and third beams,
- wherein the frequency swept laser source and the fixed frequency pump laser source are selected or configured such that the optical frequency separation of the first and second beams satisfies the coherence length condition of the non-linear artefact.

According to another aspect of the present invention, there is provided a method for generating a dual laser frequency swept signal including:
- providing a first beam from a frequency swept laser;
- providing a second beam from a fixed frequency pump laser source;
- intermodulating, the first and second beams in a non-linear optical artefact to generate a third beam, the third being an inverted copy of the first beam mirrored relative to the fixed frequency of the pump laser source; and, outputting the first and third beams, wherein one or more of the steps of providing the first beam and providing the second beam further comprise selecting or configuring one or both of the fixed frequency pump laser source and the frequency swept laser such that the optical frequency separation of the first and second beams satisfies the coherence length condition of the non-linear artefact.

Preferred embodiments of the present invention seek to utilise a R:T splitter to control split ratio and therefore optical gain.

In one embodiment, fibre end reflection is used as datum to compensate for drift. In certain implementations, optical gain may be limited by the maximum eye-safe power that can be output from the fibre end. However, in preferred embodiments such as those illustrated in FIGS. 12, 14, 15, the optical gain may be increased by separating out the local oscillators (LO) for the two frequencies $f_{sweep}$ and $f_{FWM}$. This allows more powerful LOs to be used without affecting the maximum power output from the fibre end, thus maintaining safety.

In some embodiments, length of the path taken by the LO and measurement signals in the fibres may not be matched. This will add an offset to any distance measured. This offset can be measured by analysing the signal obtained by the back-reflection of light at the fibre end.

Figure 17:
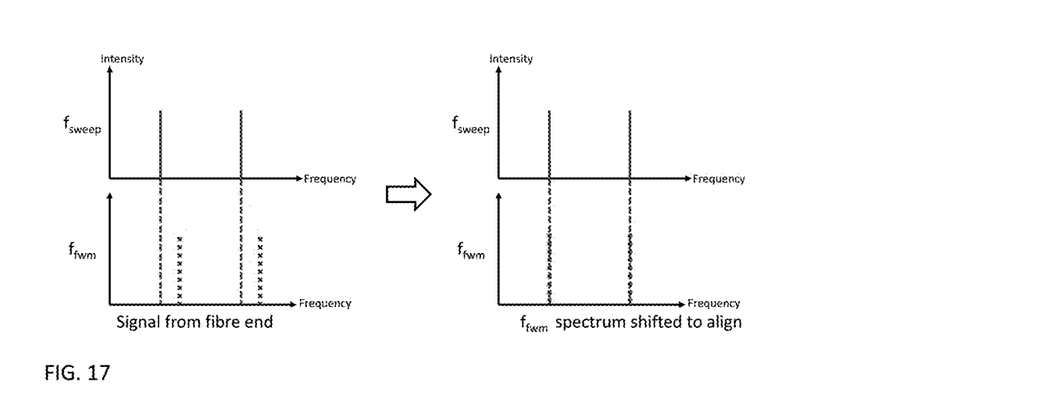

In some embodiments, the optical path length travelled in the fibres for the $f_{sweep}$ and $f_{FWM}$ signals will be different due to dispersion by the fibre. This will result in the measurements made with each signal having a different length offset. This can be mitigated by including an appropriate length of dispersion compensating fibre in the system. Alternatively, the difference in offset between the two signals could be compensated by aligning the $f_{sweep}$ and $f_{FWM}$ signals in frequency space such that the frequency component obtained from the back-reflection from the fibre ends coincide as shown in FIG. 17.

Alternatively, some other form of post processing could be applied.

The method may further comprise:

estimating frequency of the sampled light of the second measurement beam returning back along the optical fibre; and, determining the distance to be measured therefrom.

The method may further comprise:

computing a Fast Fourier Transform of the sampled light of the second measurement beam returning back along the optical fibre; and, estimating a location of a peak by performing a fit to determine said distance.

Figure 13:
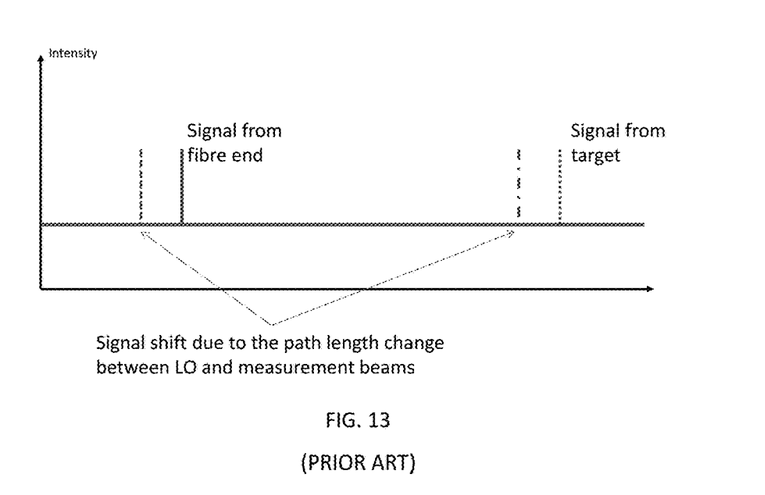
FIG. 13 shows how the datum signal received from the fibre end provides a stable measurement datum in the event of drift in the optical paths through the fibres of the setup shown in FIG. 12.

Embodiments of the present invention seek to overcome the cost issue associated with deployment of two tuneable lasers by optically generating a second optical signal from a first tuned laser output. In preferred embodiments, the optical gain issue is addressed by using a splitter with an optimised R:T ratio to control the LO signal amplitude and overcome the potential drift issue that this change introduces by arranging for a datum signal to be generated at the output fibre end. The reflection from the fibre end appears as the first peak in the frequency spectrum of the detected signal. Distances the targets can be computed from the difference between the frequency of the signal from the target and the signal from the fibre end. Drift in the signals due to stress in the fibre moves all signals equally in frequency but their relative frequencies remain constant as illustrated in FIG. 13.

Additionally, embodiments of the present invention seek to extend the motion compensation method to work in the presence of multiple targets. If the analysis described above is applied to signals obtained from more than one target, i.e. signals containing multiple frequency components, the multiplication process produces multiple beats as each frequency component in one signal beats with each component in the other signal resulting in multiple unwanted frequencies that potentially obscure or interfere with genuine signals.

Preferred embodiments overcome this as follows:

1. Compute the FFT of both signals.
2. Identify the frequency component associated with each target.
3. For each target:
   a. Isolate the signal component in each signal by applying a window in the frequency domain.
   b. Convolve the two signals in the frequency domain.
   c. Coarsely locate the peak in the magnitude of the convolved signal e.g. by finding the highest data point.
   d. Then finely locate the peak by fitting a representative model (e.g. Sinc squared) to the data around the peak and solving for the peak centre.

The algorithm described above could be implemented differently, for example, some steps could be implemented in the time domain rather than the frequency domain.

Embodiments seek to optimise dual laser frequency sweep interferometry (dual sweep FSI) in relation to signal level and cost to allow Doppler error free detection of multiple targets simultaneously. Embodiments seek to improve signal integrity with respect to motion induced (Doppler shift) errors and increase operating range by improving SNR. Embodiments may be particularly advantageous when used in combination with systems such as those set out in WO2013/144648.

In embodiments of the present invention, operation of dual-sweep FSI is made possible using a single frequency swept laser. An optical arrangement is utilised that generates a second swept optical frequency by a phenomenon known as four wave mixing (FWM). The FWM generated swept optical frequency is used instead of the output from a second frequency swept laser source, which is no longer required. This results in various advantages. The system is much cheaper than a conventional dual sweep FSI system. Issues in synchronisation experienced when two frequency swept laser sources are used are also avoided. Additional advantages include various simplifications in obtaining measurements when compared to a system with two frequency swept lasers.

In embodiments of the present invention, a single tuneable laser can be used to provide one frequency sweep, and the FWM non-linear effect is used to generate a second sweep. Due to the nature of the FWM generation process, the second sweep will always be an exact mirrored copy of the original sweep at different frequencies. The cost of this implementation is considerably lower than a synchronised dual-laser system. This implementation has the practical advantage that it no additional synchronisation is required and this leads to simplified implementation and increased reliability.

Note for the avoidance of confusion: this document makes numerous references to 'optical frequencies'. This term refers to the frequency of the electromagnetic wave, $f=c/\lambda$, where c is the speed of light, and $\lambda$ is the wavelength of the electromagnetic wave. It does not refer to any kind of modulation of a wave. It can provide light of two optical frequencies, f1 being a variable frequency and f2, which is either a fixed or a variable frequency.

In embodiments of the present invention, an optical arrangement receives light (f1) from a frequency swept laser source and a pump laser source (f2) which is directed through a non-linear optical medium such that two additional optical frequencies (f3=2f1−f2, and f4=2f2−f1) are generated by four wave mixing.

Utilising f1 and f3 or f4 in a measurement system enables dual sweep frequency scanning interferometry to be performed.

In a preferred embodiment, light from the frequency swept laser source is split between at least two paths, one being used in the four wave mixing process to generate a mirror copy and the other being retained as one of the two sources for use in dual laser frequency sweep interferometry.

In a preferred embodiment, a measurement system receives light from the output or outputs of the optical arrangement onto a light detector or detectors. The signals received by the two laser frequencies that were sent into the system are isolated and treated independently.

In a preferred embodiment, an analysis system combines the received signals to calculate the difference in path length between at least one pair of the optical paths in the measurement system in a manner that is tolerant to a changing optical path length or lengths.

Advantageously, embodiments of the present invention enable creation of a mirror copy of the supplied frequencies, which is extremely complicated to achieve using two independent sources since any small difference in the specification of each independent optic source results in a not-perfect copy.

Advantageously, the isolation and treatment of the detect laser frequencies is simplified due to the supplied frequencies being a mirrored copy. Clocks and data obtained from one of the signals will inherently be valid for the other.

The use of FWM applied to a frequency scanner laser enables generation of a synchronized mirrored copy of the original sweep. Embodiments of the present invention enable creation of an effective second sweeping signal that is a substantially perfect copy of the original (up to any small defect or imperfection). Advantageously, this can be performed at the speed of the FWM (less than picoseconds). It is understood that creating a mirror copy of this precision cannot be achieved using two individual swept sources. It is also understood that operation of two individual swept sources cannot be operated at such a speed. It is believed that even the most sophisticated compensation devices and techniques cannot match the exactitude of the copy generated through the FWM device. As a result, the quality and precision of measurements using the generated signals is expected to be improved over existing dual swept source systems. Furthermore, noise in measurement results is expected to be reduced over other systems.

Advantageously, as a consequence of creating a mirrored copy of the supplied frequencies, the components and devices used in embodiments of the present invention for measurement and detection may be greatly simplified since the same set-up used for the linearization and clock generation in a single sweep scheme will be valid for embodiments of the present invention using an FWM second sweep due to the exact nature of the mirror copy. With other dual sweeps that do not provide a mirror copy, the number of elements required as well as its complexity will be much higher (typically, double number of receivers working at double frequency).

Embodiments of the present invention are cost-effective due, at least in part, to the substitution of complete optical variable frequency sources (and the equipment required to properly synchronize the signals) with fixed sources, passive elements and a non-linear device. Embodiments of the present invention present substantial cost savings when compared to a two independent swept source alternative. Not only for the complexity reduction in detection and synchronization part, but also because the sweep laser source is the most expensive component in the system by a wide margin. It is expected that the components required to build the FWM generation system will cost at least four times less than the price of a frequency swept laser (taking into account only the purchase cost). This estimate is based on use of off-the-shelf, discrete, and bench-top elements. If devices used in FWM generation are integrated in module form and produced in high quantities, it is expected that the price difference will be even greater.

As there is no need to synchronize (more than adding some delay fibre to the original swept signal source to enable the FWM generated signal to be presented at the output at the same time as the original swept signal) and no need to make a dual compensation for linearity. This makes the detection process simpler and also further reduces the costs of the device.

As the original swept laser source and the generated mirror copy inherently track each other, this exact tracking makes activities such as sampling or re-sampling much simpler and quicker.

Embodiments of the present invention are also scalable and flexible. Due again to the nature of FWM, the optical arrangement is able to operate using differing frequency swept laser sources as FWM will work for any sweeping speed of the original signals. In contrast, a dual swept source solution will require a change in elements used in synchronization of the sources.

BRIEF DESCRIPTION OF THE DRAWINGS

Embodiments of the present invention will now be described by way of example only with reference to the accompanying drawings in which.

DETAILED DESCRIPTION

Figure 3:
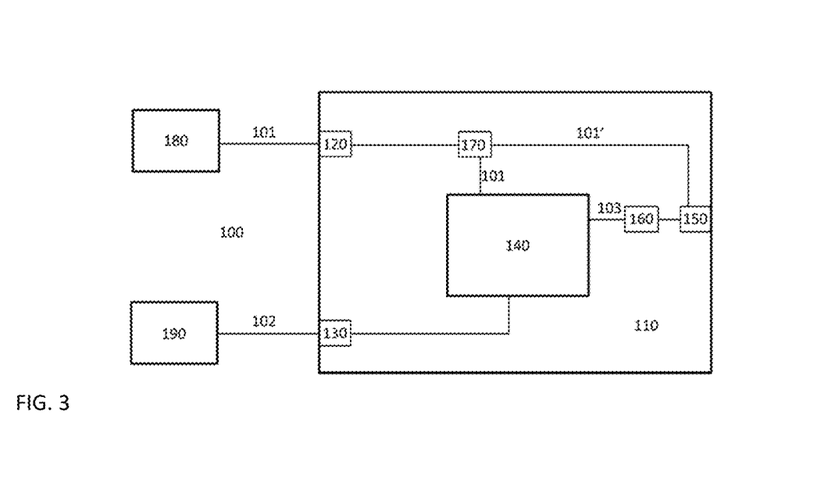
FIG. 3 is a schematic diagram of a sweep generation system including an optical arrangement according to an embodiment of the present invention.

FIG. 3 is a schematic diagram of sweep generation system 100 including an optical arrangement according to and embodiment of the present invention.

The sweep generation system 100 includes an optical arrangement 110 having a first input 120, a second input 130, a non-linear optical artefact 140 and an output 150.

The first input 120 is arranged to receive a first beam 101 from a frequency swept laser 180. The second input 130 is arranged to receive a second beam 102 from a fixed frequency pump laser source 190. The optical frequency separation of the first 101 and second 102 beams are satisfy the coherence length condition of non-linear optical artefact 140.

The non-linear optical artefact 140 is arranged to receive, and to intermodulate by four wave mixing, the first 101 and second 102 beams to generate a third beam 103, the third beam 103 being an inverted copy of the first beam 101 mirrored relative to the fixed frequency of the pump laser source 190.

The first 101, second 102 and third 103 beams are output from the non-linear optical artefact 140.

Preferably, the first and second beams 101, 102 are removed at a filter 160 before the third beam is output at the output 150 of the optical arrangement.

Preferably, the first beam 101 is split at a splitter 170 before entering the non-linear optical artefact 140 such that a copy of the first beam 101' is retained and can be combined at the output 150 with the third beam 103. Preferably, the copy of the first beam is split for a second time so that the second copy 101" may be output as well as the combination of the copy of the first beam 101' and the third beam 103.

Providing the combined first and third beams and also the first beam enables measurement techniques to be used as described below. However, it will be appreciated that combining of the first and third beams could be done later and need not be part of the optical arrangement which may simply output a first beam and a third beam, the third being an inverted copy of the first.

Examples of possible non-linear artefacts that may be used include Semiconductor Optical Amplifiers (SOAs), non-linear fibres and non-linear waveguides. An example SOA that may be used is the Kamelian 1550 nm nonlinear SOA (http://www.kamelian.com/data/nlsoa_ds.pdf). Examples of non-linear fibres that may be used are the OFS Highly-Non-Linear Fiber modules of OFS Fitel, LLC (http://ofscatalog.specialtyphotonics.com/viewitems/non-standard-optical-fibers/highly-non-linear-fiber-modules).

Embodiments of the present invention utilise properties of the non-linear optical artefact 140 to induce what is known as Four Wave Mixing (FWM) between the frequency swept laser 180 and the fixed frequency pump laser source 190. FWM is an optical phenomenon whereby two optical frequencies pass through a non-linear medium and additional frequencies are generated.

It will be appreciated that the fixed frequency pump laser source 190 need not be a fixed frequency laser—it could, for example be a variable frequency laser that is operated at a fixed frequency.

FWM is an intermodulation phenomenon in non-linear optics where the interaction between three different optical wavelengths in a non-linear medium produces other wavelengths. Given optical frequencies f1, f2 and f3, the effect creates additional peaks in frequencies that are the combination (add and subtract) of these three, with the main peaks appearing at $f_{ijk}=f_i+f_j-f_k$ (where $i,j \neq k$).

A specific variation of this effect called degenerate four-wave mixing (DFWM) is preferably used in embodiments of the present invention. In this specific case the effect takes place when there are only two frequencies present (i=j=1, k=2), in this case the main peaks are in $2f_1-f_2$ and $2f_2-f_1$. These peaks are often viewed as detrimental in optical systems, although certain commercially available non-linear devices exploit and amplify this effect such as those highlighted above.

While degenerate FWM is used in preferred embodiments of the present invention, FWM that is induced when there are three or more frequencies present can also be used. In such an arrangement, one (or more) additional laser sources would be required.

Figure 4:
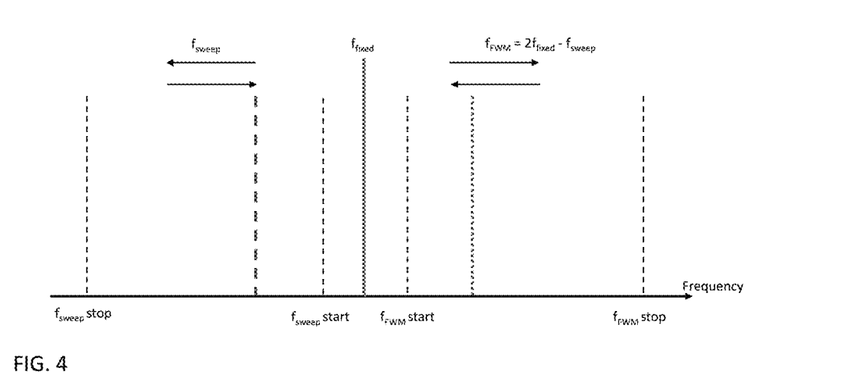
FIG. 4 is a diagram of frequencies produced by the optical arrangement of FIG. 3.

In embodiments of the present invention, this conversion effect is utilised without modulation to generate a copy of the original swept laser beam using another fixed frequency (and inexpensive) laser source as a pump. FIG. 4 shows the distribution of the peaks, having originally a fixed laser pump at a central frequency ($f_{fixed}$) and a sweep laser source ($f_{sweep}$) changing frequency continuously at a desired rate from '$f_{sweep}$ start' to '$f_{sweep}$ stop'.

Both signals are fed to a non-linear optical artefact 140 which outputs the original signals, and a frequency component at $f_{FWM}=2f_{fixed}-f_{sweep}$. There is also a third moving peak at $2f_{sweep}-f_{fixed}$ although this can be removed with an optical filter to leave only the component as presented in FIG. 4, which will be an exact inverted copy of the original sweep source mirrored relative to the fixed frequency. This second sweep will exactly mimic the changes in the frequency change rate of the original frequency swept laser. Being an exact copy, advantageously there is no need for additional synchronization.

In order to achieve effective generation of the sweep copy there are some characteristics in the optical arrangement 110 that can be included to favour the presence of FWM. The FWM effect is a non-linear phenomena associated with the Kerr effect, which means that the new frequencies generated appear as a consequence of the refractive index modulation induced by the specifications of the input light signals (both their frequencies, powers and others). FWM is related to the $\chi^{(3)}$ coefficient of the material and thus any component (fibre, semiconductor, waveguide, etc) to be used to generate the non-linearity should preferably have a high value for this specification.

The non-linear artefact is selected or configured (ie. it either has properties or else is tuned or otherwise arranged or configured) such that the optical frequency separation of the first and second beams satisfies the coherence length condition of the non-linear artefact. Preferably, for the pump and frequency swept laser sources the optical frequency separation of the inputs should be below the coherence length threshold of the non-linear artefact that is required to keep the inputs in the same wavenumber for the group index dispersion values of each device.

In order to generate a significant FWM effect in the non-linear medium, it is necessary that both input signals substantially match in wavenumber. For a given optical frequency spacing between there inputs there is a maximum length of the device (called coherence length) above which the efficiency of the conversion is greatly reduced. This coherence length condition is dependant of the non-linear artefact. Based on the characteristics of the non-linear artefact used, this will impose a limitation in the frequency separation of the inputs and thus in the conversion range for the FWM. Vice-versa, frequency separation of the inputs may be selected, tuned or otherwise configured to take into account the coherence length condition of an artefact to be used.

Discussions of coherence length conditions and optical frequency separation can be found at O. Aso, M. Tadakuma, S. Namiki, "Four-Wave Mixing in Optical Fibers and Its Applications", Furukawa review, Nov. 19, 2000 63-68, "Broadband four-wave mixing generation in short optical fibres" Electronics Letters, 36(8), 709-711; Diez, S., Schmidt, C., Ludwig, R., Weber, H. G., Obermann, K., Kindt, S., Koltchanov, I., Petermann, K., "Four-wave mixing in semiconductor optical amplifiers for frequency conversion and fast optical switching" Selected Topics in Quantum Electronics, IEEE Journal of, vol. 3, no. 5, pp. 1131, 1145, October 1997, the contents of each is herein incorporated by reference.

It will be appreciated that the coherence length conditions could be satisfied by appropriate selection/configuration/tuning of the artefact and/or of one or both of the laser sources.

Coherence length conditions identify a wavelength range where it is possible to generate a copy of the signal. In some embodiments, for example when using long components (ultra-long semiconductor devices or km fibres) additional modifications might be required to ensure a wide frequency separation operation. Something similar happens with the polarization, FWM is not a polarization dependant effect since it will take place for any arbitrary polarization of the inputs. However, the polarization of all the inputs needs to be in the same state to produce the effect more efficiently (a difference in the polarization states of the inputs will cause an optical power penalty in the converted output). Adjusting polarization for a short device again is easy (for example, by using a polarization controller at the input of one of the signals to match both states) but in long fibres where the birefringence dependence of the wavelength can make the polarization of the inputs to differ after a certain travelled distance through the fibre.

Figure 5:
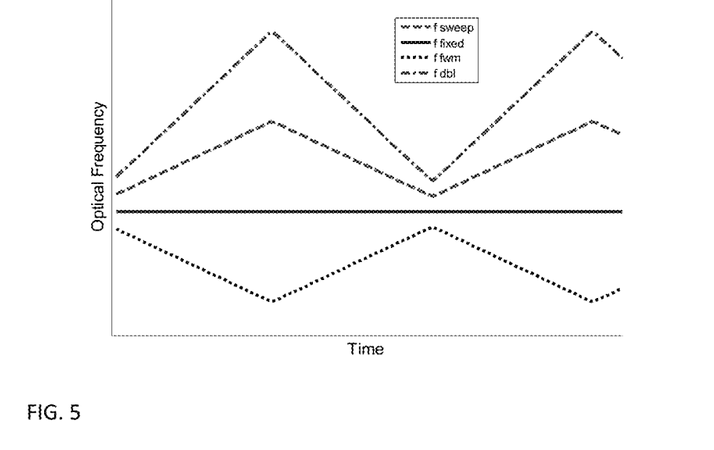
FIG. 5 is a graph plotting optical frequency of a sweep laser against time.

The semiconductor optical amplifier (SOA) has four optical frequencies output from it. When the optical frequency of the sweep laser is swept, these frequencies vary in time as shown in FIG. 5. It is desired to obtain an output that consists only of f_sweep and f_FWM. One method of doing this is to send the output of the SOA through an optical filter that rejects all optical frequencies from f_fixed and higher, which isolates f_FWM only. This may then be combined with f_sweep. Other implementations may be possible using different combinations of optical filters, combiners, etc. to achieve the same effect. e.g. taking the output of the SOA, and using a filter that rejects f_fixed and f_dbl (f_dbl=(2*f_sweep)−f_fixed). This wouldn't be ideal, however, as the frequency ranges of f_dbl and f_sweep overlap. This could be avoided with a different choice of sweep range for f_sweep, but it restricts the sweep range, which reduces measurement precision.

Figure 6:
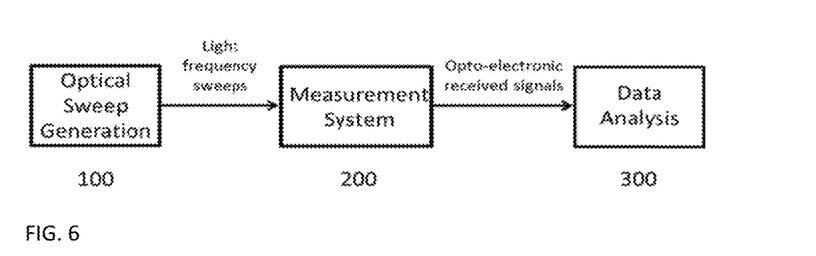
FIG. 6-9 are schematic diagrams illustrating aspects of a measurement system according to an embodiment of the present invention.

FIG. 6 is a schematic diagram of a measurement system according to an embodiment of the present invention. The measurement system is split into three stages, although it will be appreciated that more or less stages could be used.

A first part (sweep generation system 100) generates light containing swept optical frequencies as described above. This light is provided to the second part (measurement system 200) that sends this light through an optical system to be measured and detects the output of this optical system. The measurement system 300 provides data to the final part (data analysis system 300) which processes this data and calculates the final measurement result: a distance measurement.

Figure 7:
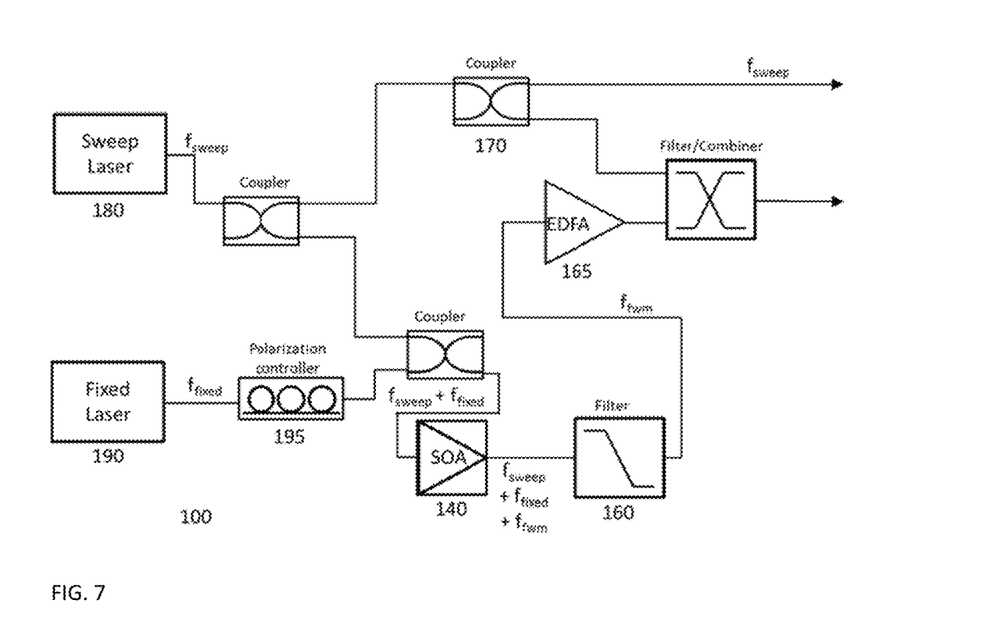

FIG. 7 is a schematic diagram of an embodiment of the interferometry source 100 of FIG. 6.

Light from the sweep laser 180 is split by an optical coupler, one part 101 of the signal being used to feed the FWM conversion and the other part 101' retained for later user. The fixed laser 190 is operated at the central wavelength. The output of the fixed laser 190 is preferably controlled in polarization with a paddle controller 195 and supplies the pump.

Both signals (fixed and sweep) that enter into the non-linear medium preferably have substantially the same state of polarization. This way, the FWM effect is maximized. Both inputs are coupled into the non-linear artefact 140, in this case a semiconductor optical amplifier (SOA) specifically selected or designed to enhance the non-linear effects: high $\chi^{(3)}$ and its length is below the coherence length for the maximum frequency separation of the inputs. Gain in the non-linear artefact reduces the need for boosted inputs. At the SOA output, the original signals and the new generated peak are provided. An optical filter 160 is applied so only the second inverted sweep peak remains. Both the sweeping signal and the fixed inputs are discarded so only the converted FWM can be found at the output. Finally an EDFA amplifier 165 is used to raise the level of the output signal to similar values of the first sweep. This scheme generates the desired two inverted sweep signals required for a dual FSI application.

Although this set-up uses components suitable for operation in the telecomms C-Band (at wavelengths from 1530 nm to 1560 nm), it can be translated to other optical frequencies by using a non-linear device with its characteristics suited to the new wavelength range, since FWM effects are present in many optical bands where we can find a material with the desired specifications (high $\chi^{(3)}$, coherence length condition satisfied, polarization match)(see 'Increasing Coordinate Resolution' below). Therefore, a similar design changing the specific C-Band components could be used for applications of interferometry that operate in other wavelength ranges. It will be appreciated that this will open the possibilities to employ dual sweep generation to improve other applications outside range estimation such as optical coherence tomography (OCT) or surface evaluation.

The illustrated sweep generation system 100 provides two light outputs via optical fibre to the measurement system 200; one fibre contains only $f_{sweep}$, the other contains both $f_{sweep}$ and $f_{FWM}$.

Figure 8:
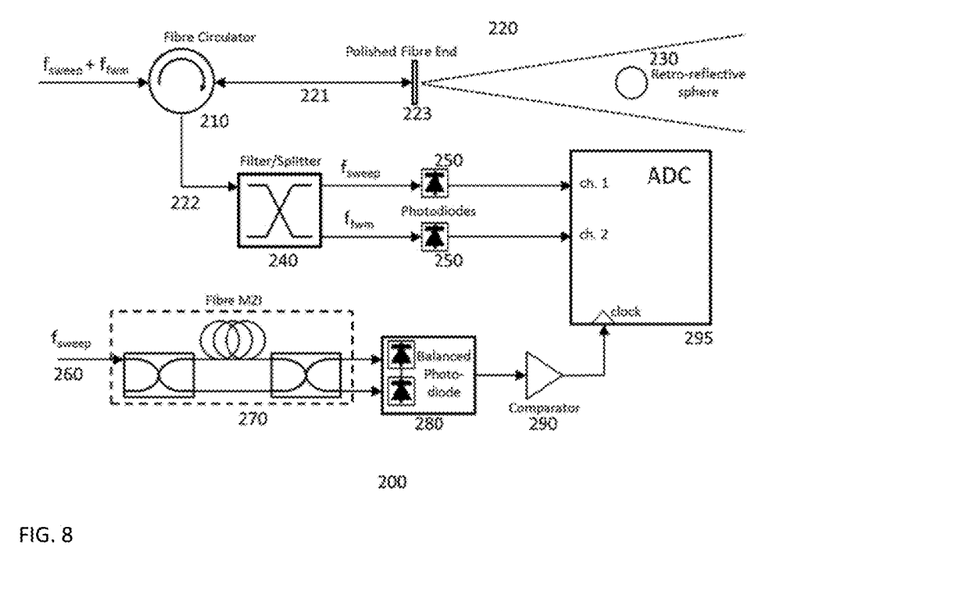

FIG. 8 is a schematic diagram of an embodiment of the measurement system 200 of FIG. 6. The sweep generation system 100 provides light containing $f_{sweep}$ and $f_{FWM}$ via an optical fibre (shown at the top left of the diagram). This optical fibre guides the light, via a fibre optic circulator 210, into an interferometer 220. The distance to be measured is the optical path difference of this interferometer 220, which will be arranged to correspond to some physical length that is required to be measured. In this example, the interferometer 220 is formed by two optical paths 221, 222. Light reaching the flat polished fibre end 223 experiences an approximately 4% reflection, and the reflected light returns back down the same fibre. The remainder of the light travels out into free space, where some is reflected back into the fibre by a retroreflector 230 (in this example a glass sphere with a refractive index of 2 acts as a retroreflector).

The optical power resulting from the interference of these two paths travels back down the fibre, and is directed by the fibre-optic circulator 210 to a red/blue filter 240. This separates $f_{sweep}$ and $f_{FWM}$ into separate fibres, each of which guides their light onto a photodiode 250. The photodiode signals are recorded by an ADC 295.

In the lower half of the diagram, an optical fibre 260 containing light of frequency $f_{sweep}$ guides this light through a fibre-Mach-Zehnder interferometer 270 onto a pair of balanced photodiodes 280 whose difference output is sent through a zero comparator 290 which generates a trigger signal that is sent to the ADC 295. The ADC records samples at times controlled by this trigger signal. This ensures that the data are sampled at equal intervals of $f_{sweep}$ (and therefore also at equal intervals of $f_{FWM}$, as one varies as the inverse of the other), even if the rate of change of $f_{sweep}$ varies (as it typically does).

To make a measurement, the frequency swept laser sweeps its output frequency, $f_{sweep}$, through a range whilst the ADC records data at sampling times controlled by the Mach-Zehnder interferometer.

Figure 9:
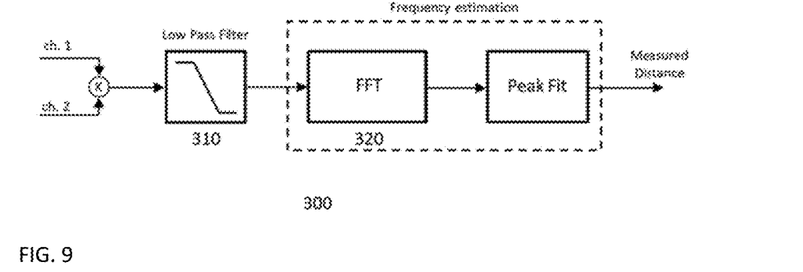

FIG. 9 is a schematic diagram of the data analysis system of FIG. 6. The interference signals from $f_{sweep}$ and $f_{FWM}$ are preferably passed through a band pass filter 310 and multiplied. This has been shown to remove disturbances to the signal caused by movement of the target during the measurement. The resulting signal contains a sinusoidal signal that has a frequency that is proportional to the distance to be measured. Any of many existing frequency estimation algorithms may be used to measure this frequency, and therefore the distance to be measured. For example, the Fast Fourier Transform (FFT) 320 of the signal may be computed, and the location of a peak corresponding to the sinusoidal signal of interest may be estimated by a polynomial fit or other fitting technique.

Other data analysis methods may be used, for example the 'dynamic FSI' method described in GB1013896.4, a copy of which is herein incorporated by reference.

Figure 14:
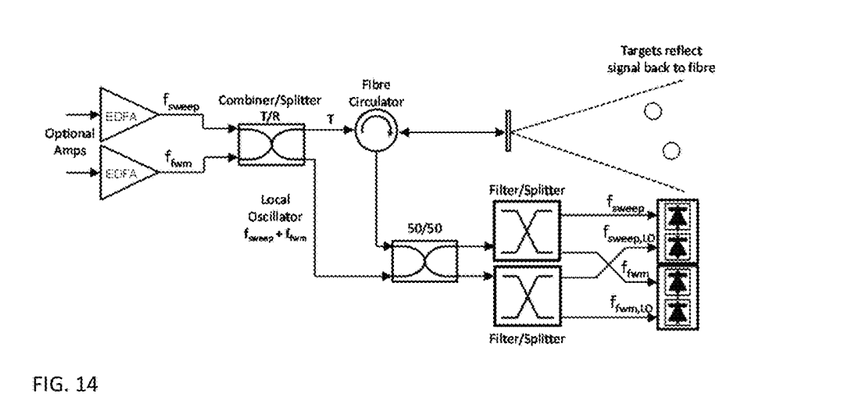
FIG. 14 shows how the original sweep and FWM generate sweep can be optically combined and decoupled to produce signals from one or more targets with a datum reflection from the output fibre end.

FIG. 14 shows another embodiment of the measurement system 200 of FIG. 6. The original tuned laser output, $f_{sweep}$, and the mirrored signal produced by FWM, $f_{FWM}$, are be optically combined and used to measure distance to one or more targets in the field of view. The light from the original and FWM generated sweeps is optionally amplified by EDFAs. The EDFA outputs are then combined and split using a combiner/splitter with a split ratio of R:T. The R portions form the local oscillators later used to generate separate signals on two sets of balanced detectors. The T portions are passed to a circulator. The circulator output is coupled to an optical fibre that transmits most the combined original, $f_{sweep}$, and FWM generated light, $f_{FWM}$, towards the target(s). A small fraction of the both signals is reflected back by the fibre end to provide a datum signal against which target distances are to be measured. The transmitted light is reflected by the target(s) and returned into the fibre.

The circulator outputs the reflected light (original sweep and FWM generated sweep) from the targets and the fibre end into combiner that combines these signals with the LO signals derived previously. A pair of filters then splits off the original sweep signal and the FWM generated signals and their respective LOs. These optical signals are then independently mixed with their respective LOs and detected on a pair of balanced detectors. This configuration ensures that the two measurement beams follow the same path and the two LO beams follow a (separate) common path up to the final combiner so that fibre-induces delays in either path are common to the signals derived from the original and the FWM generated signals. After the filter, each signal and it's LO follow a common path, so fibre-induced changes are common and don't therefore induce distance measurement error.

FIG. 13 shows an example of the Frequency spectrum that would be obtained from one of the detectors. The left hand peak corresponds to the reflection from the fibre end. Its absolute frequency corresponds to the optical path length difference between the light reflected from the fibre end and the path travelled by the LO beam. The second peak corresponds to the target. Its frequency corresponds to the optical path length difference between the light reflected from the target and the path travelled by the LO beam. Since the path travelled by the LO beam is common to both signals, changes in the optical path length of the LO beam represents a frequency shift of both signals, but does not change their frequency difference.

Figure 15:
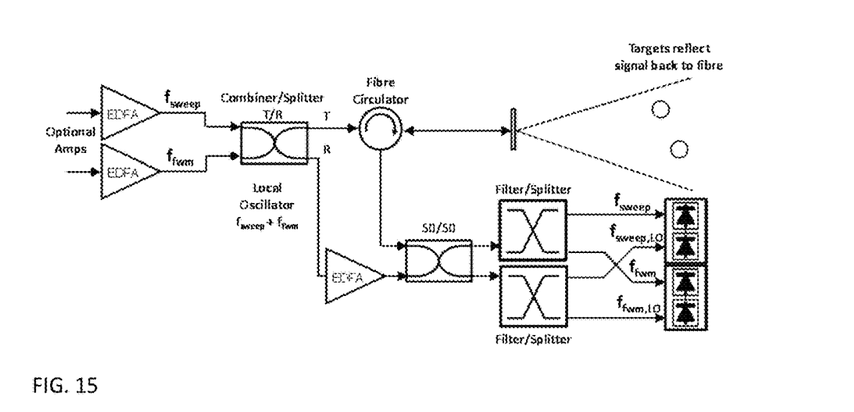
FIG. 15 shows another version of the scheme shown in FIG. 14, in which an EDFA amplifier is included in the LO path to boost the LO signal.

FIG. 15 shows an alternative embodiment of the measurement system 200 of FIG. 6 in which the input signals, $f_{sweep}$ and $f_{FWM}$ may again be optionally amplified prior to combining and the LO beams are further amplified by an additional EDFA to further increase the optical gain of the system.

Figure 16:
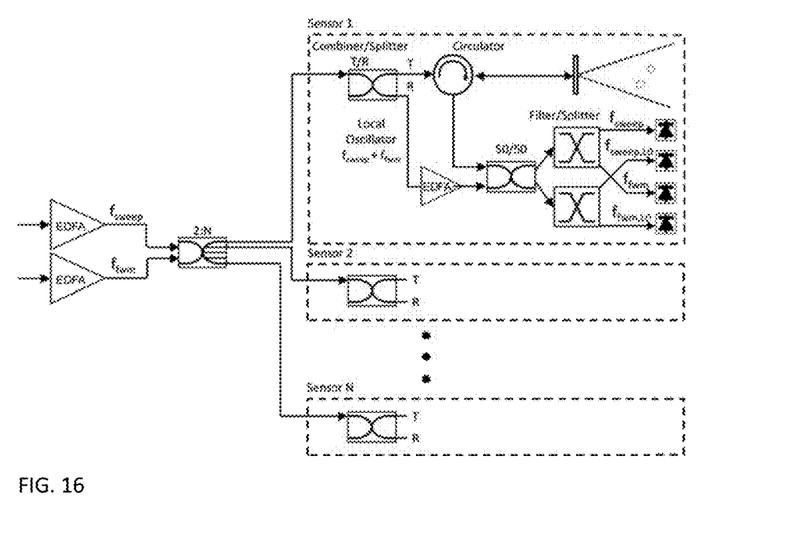
FIG. 16 shows how multiple sensors can be feed from the same laser source signals; and, FIG. 17 shows how dispersion in the fibre can be compensated by frequency shifting one signal, derived from e.g. $f_{sweep}$, with respect to the other signal derived from $f_{FWM}$.

FIG. 16 illustrates how the first combiner/splitter in FIGS. 14 and 15 may be re-configured to supply multiple sensors. After optional amplification by EDFA, $f_{sweep}$ and $f_{FWM}$ are combined/split using a 2:N combiner/splitter. Each output of the combiner/splitter is then fed to a separate sensor including an R:T splitter, circulator, 50:50 combiner, two filters and balanced detector pairs. Optionally, an EDFA may be included in the LO path.

FIG. 17 shows how differential offsets between the signals obtained for the two sweeps can be compensated by frequency shifting one signal with respect to the other such that the signals derived from the end of the fibre are aligned in frequency.

Further embodiments are possible in which alternative optical configurations are used. Furthermore, some, or all of the combiners, splitters, filters, circulators and fibres shown in Figures could be implemented using planer waveguide circuits instead of fibre optic devices.

Experimental Results

A set-up corresponding to that set out above has been built, the generated FWM sweep and the original sweep have been tested at the same time in a real distance measurement experiment with the FWM generated sweep being a perfect mirrored copy of the original.

The behaviour of both sweeps against the same moving target presents a displacement of the beat frequency in opposite directions for each sweep, as it should be when using opposed sign sweep rates, which proves that sweeps can be used to cancel the vibrations of the targets. Furthermore processing of the measured data has proven the elimination of the broadening of the signal that takes place with the vibrations.

Figure 10A:
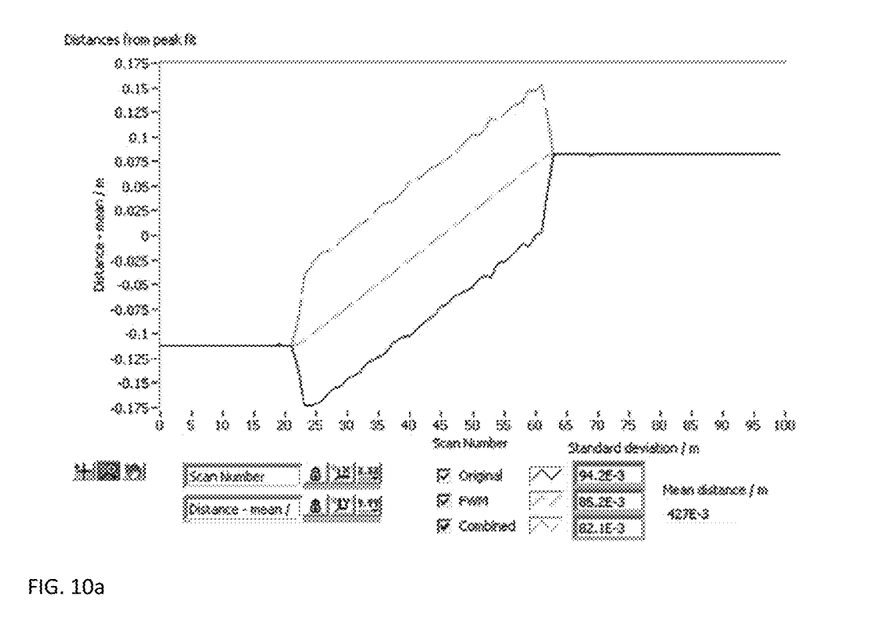
FIG. 10 is a series of graphs plotting experimental results of measured distance to a moving reflective target over a series of 100 measurements.

FIG. 10a shows three different plots of the measured distance to a moving reflective target over a series of 100 measurements taken in quick succession. The three lines correspond to the calculated distance using three different analysis methods. The bottommost and topmost lines show the distance as calculated using a one-laser FSI analysis method. The bottommost line shows the distance as calculated using only the data from the tuneable laser. The topmost line shows the distance as calculated using only the data from the FWM generated light. The middle line shows the distance as calculated using the Dual-sweep FSI analysis method described in the Dual-sweep FSI section.

During the 100 measurements, the target was moved from one static position to another, and while it is moving the advantages of the dual sweep vs the single sweep can be clearly seen. When the target starts to move, both the original and the FWM copy start to get the measurements wrong (and by a significant factor, in the order of tens of mm) while the combined measurement analysis gives a precise estimation of the distance to the target while in movement. The vibrations of the moving target can also be seen in the single sweep results: the black and red lines present ripples and are considerably less smooth than the green line from dual sweep analysis.

Figure 10B:
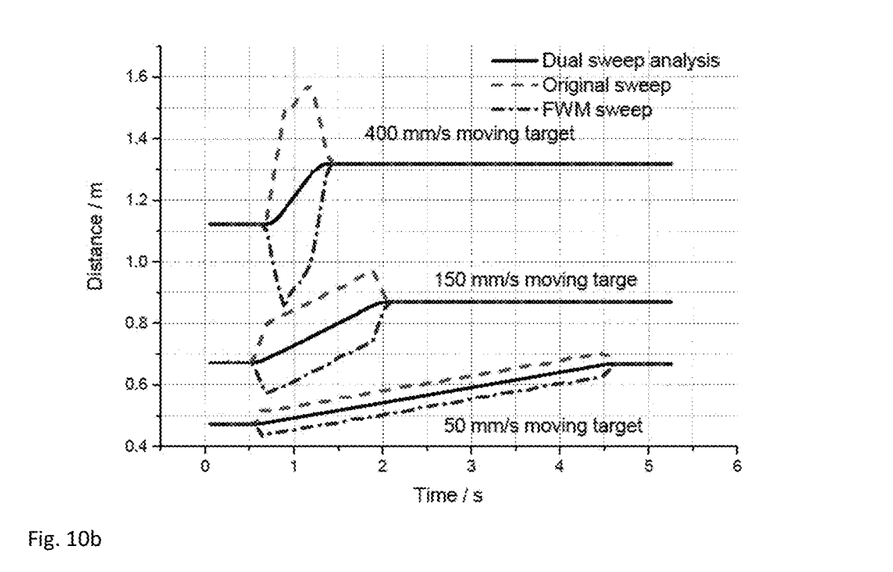

FIG. 10b shows similar results to those of FIG. 10a, but with three targets moving at three different speeds.

The content of the abstract filed herewith and of GB 1411206.4 upon which this application claims priority is herein incorporated by reference.

The invention claimed is:

1. A distance measurement system comprising an optical arrangement and a dual sweep frequency scanning interferometry system, the optical arrangement including:
   a frequency swept laser;
   a fixed frequency pump laser source;
   a first input to receive a first beam from the frequency swept laser;
   a second input to receive a second beam from the fixed frequency pump laser source;
   a non-linear optical artefact to receive, and to intermodulate, the first and second beams to generate a third beam, the third being an inverted copy of the first beam mirrored relative to the fixed frequency of the pump laser source;
   a filter to extract the third beam from the output of the non-linear optical artefact; and
a combining element to combine and output the first and the filtered third beam to the frequency scanning interferometry system,
wherein the non-linear artefact is configured such that the optical frequency separation of the first and second beams satisfies the coherence length condition of the non-linear optical artefact and induces four wave mixing in the non-linear optical artefact to generate the third beam when the first and second beams are intermodulated, the dual sweep frequency scanning interferometry system including an interferometer and is arranged to direct the combined first and third beams through the interferometer to illuminate a target point, to receive a reflected signal and determine the distance to the target point therefrom.

2. The distance measuring system of claim 1, further including a first coupler to receive the first beam, to divide the beam into a first and second portion and provide the first portion to the non-linear optical artefact.

3. The distance measurement system of claim 2, wherein the frequency scanning interferometry system is configured to direct the second portion of the first beam from the frequency swept laser source received from the coupler into a further interferometer and to derive a sampling signal therefrom corresponding to equal intervals of the first measurement beam, the frequency scanning interferometry system being arranged to sample the reflected signal at a frequency controlled by the sampling signal to measure the frequency of the reflected signal.

4. The distance measurement system of claim 3, wherein the frequency scanning interferometry system is further arranged to pass interference signals from first and third beams from the interferometer through a band pass filter and multiply them together to remove disturbances and obtain a signal from which frequency is measured to determine distance to the target point.

5. The distance measurement system of claim 4, wherein the frequency scanning interferometry system is arranged to measure the sinusoidal frequency of the signal to determine distance to the target point.

6. The distance measurement system of claim 5, further comprising a data analysis system arranged to compute a Fast Fourier Transform of the sinusoidal signal and estimate a location of a peak corresponding to the sinusoidal signal by performing a polynomial fit to determine said distance to the target point.

7. The distance measuring system of claim 1, wherein the non-linear optical artefact comprises a semiconductor optical amplifier.

8. The distance measurement system of claim 1, further comprising an optical amplifier between the filter and the combining element, the optical amplifier being configured to raise the level of the third beam to substantially that of the first beam.

9. The distance measurement system claim 1, the frequency swept laser source being coupled to the first input and the pump laser source being coupled to the second input.

10. A method for measuring a distance using dual sweep frequency scanning interferometry including:
   receiving a first beam from a frequency swept laser;
   receiving a second beam from a fixed frequency pump laser source;
   intermodulating, the first and second beams in a non-linear optical artefact to generate a third beam, the third being an inverted copy of the first beam mirrored relative to the fixed frequency of the pump laser source;
   filtering the third beam from the output of the non-linear optical artefact; and
   outputting the first and third beams to a frequency scanning interferometry system,
   wherein the non-linear optical artefact is configured such that the optical frequency separation of the first and second beams satisfies the coherence length condition of the non-linear optical artefact and induces four wave mixing in the non-linear optical artefact to generate the third beam when the first and second beams are intermodulated,
   the dual sweep frequency scanning interferometry system including an interferometer, the method further comprising directing the first and third beams through the interferometer to illuminate a target point, receiving a reflected signal, and determining the distance to the target point therefrom.

11. The method of claim 10, further including dividing the first beam into a first and second portion and providing the first portion to the non-linear optical artefact and the second portion to the frequency scanning interferometry system.

12. The method of claim 10, including:
directing the second portion of the beam from the frequency swept laser into a further interferometer and deriving a sampling signal therefrom corresponding to equal intervals of the first measurement beam; and
sampling the light of the second measurement beam returning back along an optical fiber at a frequency controlled by the sampling signal to measure the frequency of the reflected signal.

13. The method of claim 12, further comprising passing interference signals from the interferometer from first and third beams from the interferometer through a band pass filter, multiplying them together to remove disturbances and obtaining the signal from which frequency is measured to determine distance to the target point.

14. The method of claim 13, further comprising measuring the sinusoidal frequency of the signal to determine distance to the target point.

15. The method of claim 14, further comprising computing a Fast Fourier Transform of the sinusoidal signal and estimating a location of a peak corresponding to the sinusoidal signal by performing a polynomial fit to determine said distance to the target point.

* * * * *